UNITED STATES PATENT OFFICE.

LOUIS JOSEPH ERNEST HUBOU, OF LE RAINCY, FRANCE.

PROCESS OF MAKING LAMPBLACK.

SPECIFICATION forming part of Letters Patent No. 671,672, dated April 9, 1901.

Application filed April 13, 1898. Serial No. 677,640. (No specimens.)

*To all whom it may concern:*

Be it known that I, LOUIS JOSEPH ERNEST HUBOU, a citizen of the Republic of France, residing at Le Raincy, France, have invented certain new and useful Improvements in Processes of Making Lampblack, of which the following is a specification.

It is known that acetylene gas decomposes into its elements—carbon and hydrogen—under a temperature which Lewes places at 780° centigrade. The experiments of Berthelot and Vieille have shown that it decomposes when compressed by the exciting action of a percussion-priming, by an induction-spark, or by simple ignition by means of a metallic wire made incandescent by an electric current. It is also known that the combustion of acetylene gas can give a deposit of amorphous carbon when the proper proportion of air is arranged for that combustion, so as not to produce the complete oxidation of that gas. In this latter case the carbon obtained is always of a black, more or less reddish, in consequence of the formation of polymeres of acetylene and of their oxidation by the flame. On the other hand, the incomplete combustion of the acetylene gas produces a loss of carbon and a decreased return, which on account of the cost price of acetylene is far from being unimportant. On the contrary, the entire return from acetylene of pure carbon is, say, 92.3 per cent. by decomposing it out of the air by the action of electricity or of heat or of chemical agents. The carbon thus formed is pulverizable, voluminous, and purer than any other black hitherto known. The blacks of commerce—blacking, German black, Spanish black, peach-black, lampblack, petroleum-black, &c.—are not, in fact, formed of pure carbon, but of carbon mixed with resinous or bituminous substances, carburet of hydrogen, and with salts, and they have to be refined generally by calcination and washing. On the other hand, by quick or slow decomposition of acetylene gas, compressed or not, under the action of a sufficient source of energy, such as electric or calorific energy, a black is obtained which is characteristic and of special and superior quality to the existing blacks. This is what I have recognized in trying this black from a commercial point of view. I have taken note that it possesses a new characteristic which I wish to guarantee by the present application for a patent.

I produce a carbon-black by compressing acetylene gas under two or three atmospheres and exploding it by electricity, the final pressure of the hydrogen resulting from the decomposition not exceeding twenty-five atmospheres. The deposited carbon is then removed and ready for use. All the return of this acetylene is immediately obtained in acetylene-black, and that without fear of explosion, by employing steel receivers, such as those constantly manufactured, capable of resisting two hundred atmospheres and more.

This new black has the advantage of being manufactured at the first touch and of being ready for use at once. It is one of the purest carbons in existence. It possesses a tenuity and lightness which are peculiar, is oily, velvety, and a fine free black. It is a special and quite peculiar black. It mixes well with oils, essences, albumen, glue, dextrine, glucose, water, &c. Ground with oil, for instance, it leaves no lumps and spreads very evenly. Black paint thus produced and exposed to the air dries without change of tone or cracking. I have tried it for making inks. Using it, for instance, for engraving, I have obtained very clear proofs. This "acetylene-black" preserves all the details and half-tints, while the other blacks give heavier tints, which often require softening. Mixed with water and glue it gives a deep black "velvety and luminous," so to speak, and with an incomparable richness of tone. Mixed with oil and essence it gives a pigment which when varnished is capable of replacing Japan varnish.

My researches have demonstrated to me that this acetylene-black is destined to be advantageously employed for superior inks, and in particular Chinese ink, (Indian ink,) for printing, lithographic, and autographic inks, for etchings, heliographs, carbon photography, for oil-colors, essence-colors, and water-colors, for varnishes and lacquers, for printing on cloth, and generally for all applications of blacks already known. The industrial advantages of my application of it rest on the fact that acetylene gas is the gas which is richest in carbon, that it is, in fact, in a measure pure carbon, and that I obtain its full return in marketable black. Practical applications of the calorific and chemical sources of energy mentioned will be found in the furnace and the electric battery.

Having fully described my invention, what I claim, and desire to secure by Letters Patent, is—

The process of making carbon-black which consists in exploding acetylene gas under pressure out of contact with the air by means of an electrical, chemical or calorific source of energy and removing the deposited carbon for mechanical and commercial use substantially as described.

LOUIS JOSEPH ERNEST HUBOU.

Witnesses:
EDWARD P. MACLEAN,
JOHN S. ABERCROMBIE.